US006883969B2

United States Patent
Tsuchiya et al.

(10) Patent No.: US 6,883,969 B2
(45) Date of Patent: Apr. 26, 2005

(54) PIVOT BEARING ASSEMBLY AND A METHOD OF MANUFACTURING THE SAME

(75) Inventors: Kunihiro Tsuchiya, Nagano-ken (JP); Toshisada Koyama, Nagano-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 24 days.

(21) Appl. No.: 10/358,094

(22) Filed: Feb. 4, 2003

(65) Prior Publication Data

US 2003/0156773 A1 Aug. 21, 2003

(30) Foreign Application Priority Data

Feb. 5, 2002 (JP) ........................................ 2002-028819

(51) Int. Cl.⁷ .............................................. F16C 19/10
(52) U.S. Cl. .................................................... 384/617
(58) Field of Search ................................ 384/617, 613, 384/620, 619, 121

(56) References Cited

U.S. PATENT DOCUMENTS

| 4,018,851 A | 4/1977 | Baccei |
| 4,754,353 A | 6/1988 | Levy |
| 4,888,656 A | 12/1989 | West |
| 2001/0038727 A1 | 11/2001 | Miyazaki et al. |

FOREIGN PATENT DOCUMENTS

| EP | 0522717 A2 | 1/1993 |
| GB | 1528626 | 10/1978 |
| JP | 06-225495 | 8/1994 |
| JP | 07-274462 | 10/1995 |
| JP | 2000-187952 | 7/2000 |

*Primary Examiner*—Lenard A Footland
(74) *Attorney, Agent, or Firm*—Flynn, Thiel, Boutell & Tanis, P.C.

(57) ABSTRACT

A pivot bearing assembly that can be easily assembled without deformation and featuring a lower amount of outgas and thermal compensation of bond strength. Further, with the pivot bearing assembly, a bearing inner ring and a shaft and a bearing outer ring and a housing are slidingly fitted, bonded and secured to each other with an ultraviolet curing type anaerobic adhesive having a high vitrification temperature, respectively.

3 Claims, 2 Drawing Sheets

PIVOT BEARING ASSEMBLY AND A METHOD OF MANUFACTURING THE SAME

CROSS-REFERENCE TO RELATED APPLICATIONS

This application claims all rights of priority to Japanese Patent Application No. 2002-028819 filed on Feb., 5, 2002 (pending).

BACKGROUND OF THE INVENTION

1. Field of the Invention

The invention relates to a pivot bearing assembly employing an anaerobic adhesive of an ultraviolet-irradiation curing type, and a method of manufacturing the same.

2. Description the Related Art

An example of a storage device of a computer, a magnetic head 4 provided at one end of an actuator 3 supported by a pivot bearing assembly 1 is enabled to pivot over a magnetic disk 5 shown in FIG. 1, thereby storing information, and retrieving the information. The pivot bearing assembly 1 is normally supported by an upper bearing and a lower bearing (not shown) (refer to FIG. 2).

In a case of a conventional pivot bearing assembly, a thermosetting curing type adhesive is used when securing a bearing inner ring to a shaft, and securing a bearing outer ring to a housing, however, conventional methods using the thermosetting curing type adhesive had an outgas problem, generated from an uncured portion of the adhesive. Further, there is another method in order to secure these components without any concern of outgas generation wherein a press-fit is introduced. However, this method not only made precision components retain an unacceptable elastic deformation and/ or retain an unacceptable creep by a stress between each of the two components but also had a problem of difficulty with applying a preload to the pivot bearing assembly at the time of assembly, resulting a low productivity including a low production yield.

SUMMARY OF THE INVENTION

The present invention was conceived to solve the problem of the prior art described above and the object of the present invention is to provide a pivot assembly that can be easily assembled without any deformation by the press fit assembly and lower the amount of generated outgas. It is another object of the invention to gain a bonding strength of the pivot bearing assembly by minimizing a thermal compensation thereof.

With the present invention, a bearing, a shaft and a housing are set into a jig in an environment where no oxygen exists, and as shown in FIG. 2, an ultraviolet curing type anaerobic adhesive having a high vitrification temperature is applied to, or injected to predetermined spots (1-1) between the bearing inner ring and the shaft and predetermined spots (1-2) between the bearing outer ring and the housing. After the adhesive is cured, an excess amount of the adhesive portion (7) is irradiated by ultraviolet rays under an atmosphere where oxygen exists as shown in FIG. 3, and an overflowed portion of the adhesive (7) is further cured.

The ultraviolet curing type anaerobic adhesive having a high vitrification temperature in the present invention not only separates a lesser amount of outgas, it also has improved thermal compensation of bonding strength.

An example of the environment where no oxygen exists is a high state in a chamber, and oxygen present in the applied or injected adhesive is discharged, thereby leading the adhesive to be cured.

DESCRIPTION OF THE PREFERRED EMBODIMENTS

A full understanding of the invention can be gained from the following description of the preferred embodiments when read in conjunction with the accompanying drawings in which:

In the invention, an ultraviolet curing type anaerobic adhesive has a high vitrification temperature not lower than 120° C., more preferably in the range of 140 to 200° C. In case of the vitrification temperature exceeding more than 200° C. although the curing time under the environment where no oxygen exists is less, the predetermined preload of the pivot bearing assembly cannot be secured since the curing time of the anaerobic adhesive is too short. There is a tendency such that use of an ultraviolet curing type anaerobic adhesive having a lower than 120° C. vitrification temperature causes the amount of outgas to be the same as the conventional art, and also the thermal compensation of bonding strength is small as the conventional art.

The ultraviolet curing type anaerobic adhesive is an adhesive composition obtained by adding a photopolymerization initiator, and an organic hydroperoxide to a monomer composition containing a methacrylate diester at 80 to 96 mol %, hydroxyalkyl methacrylate at 2 to 10 mol %, and an acrylic acid dimmer at 2 to 10 mol %, and the ultraviolet curing type anaerobic adhesive of such a composition as described has a high vitrification temperature, and is extremely low in the amount of the outgas generated. To 100 mass parts of the monomer composition, 1 to 5 mass parts, preferably 2 to 3 mass parts, of the photopolymerization initiator is added while 0.2 to 2 mass parts, preferably 0.5 to 1.0 mass part, of the organic hydroperoxide is added to 100 mass parts of the monomer composition.

The ultraviolet curing type anaerobic adhesive according to the invention may contain a suitable amount of curing agent and stabilizer as necessary.

In the case of the ultraviolet curing type anaerobic adhesive having the high vitrification temperature, for use in carrying out the invention, portions of the adhesive, present in regions where components are fitted to each other, are fed therein when there exists no oxygen, and are in the form of a thin adhesive layer, and consequently, full curing thereof is enabled, exhibiting typical anaerobic properties thereof.

Figure 3:
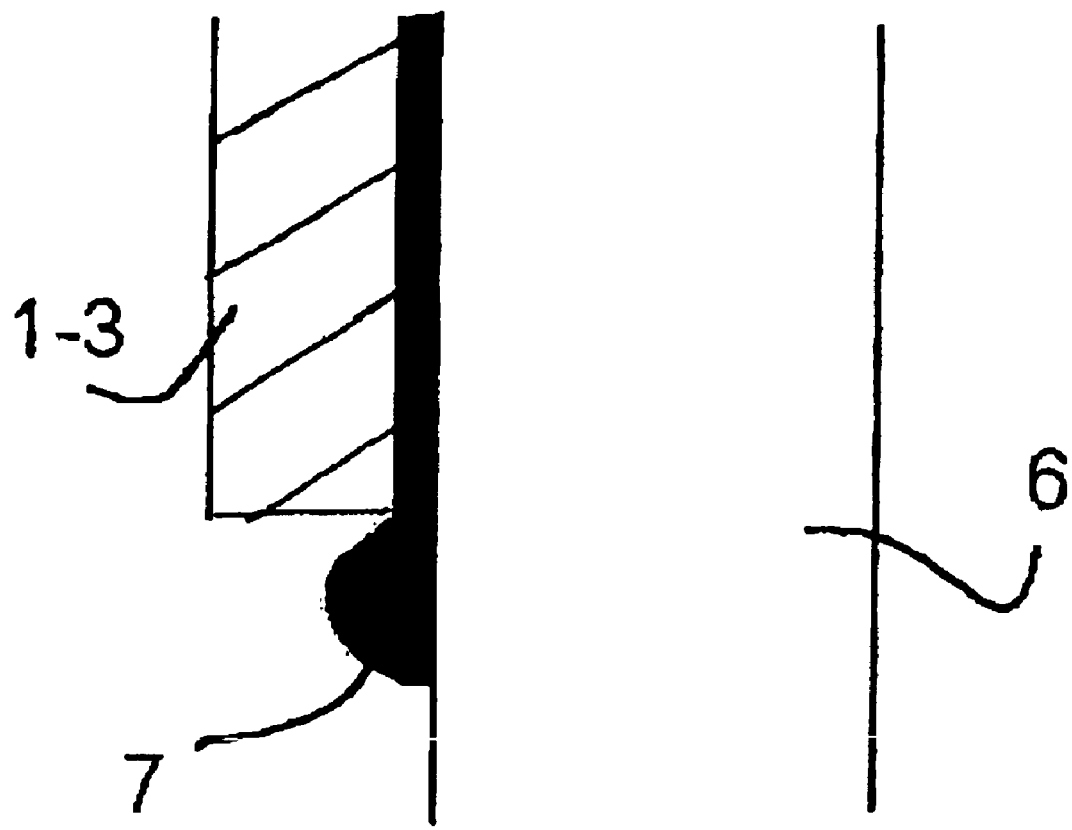
FIG. 3 is a schematic illustration of an overflowed portion of an adhesive.

However, in order to form the thin adhesive layer, as can be seen in FIG. 3, an excess amount of applied or injected adhesive is overflowed and oozed as portions 7, and are not cured with the monomer remaining therein. If this uncured portion is retained as it is, the monomer not cured as yet is turned into outgas, thereby to be adsorbed in the surface of a storing media (magnetic disk), thereby not only causing corrosion of the magnetic disk but also creating a direct cause of erroneous operation in the case of a high-density magnetic disk. Hence, it is necessary to cure the remaining monomer, and the portions 7 can be cured by ultraviolet irradiation.

Various embodiments of the invention are:
(1) A pivot bearing assembly comprising a bearing inner ring, a shaft, a bearing outer ring, and a housing, wherein between the bearing inner ring and the shaft, between the bearing outer ring and the housing are slidingly fitted, bonded and secured to each other with an ultraviolet curing type anaerobic adhesive having a high vitrification temperature, respectively.
(2) It is another invention of a pivot bearing assembly as set out under item (1) above, wherein an ultraviolet curing type anaerobic adhesive having a vitrification temperature not lower than 120° C., and lower than or equal to 200° C., an excess of the adhesive is further cured by ultraviolet irradiation.
(3) It is still another invention that a pivot bearing assembly as set out under items (1) or (2) above, wherein an ultraviolet curing type anaerobic adhesive comprises a composition containing a methacrylate diester as a main constituent, hydroxyalkyl methacrylate, an acrylic acid dimmer, an organic hydroperoxide, and a photopolymerization initiator.
(4) A method of manufacturing a pivot bearing assembly, comprising the steps of setting a plurality of pivot bearing, a shaft and a housing in an assembly apparatus in a chamber under an extremely high vacuum, applying or injecting an ultraviolet curing type anaerobic adhesive to predetermined spots between a bearing inner ring and a shaft, and spots between a bearing outer ring and a housing, and irradiating an overflowed portion of the adhesive with ultraviolet rays so as to further cure the overflowed portion of the adhesive.
(5) A method of manufacturing a pivot bearing assembly as set forth under item (4) above, wherein the step of causing the bearing to be kept within the assembly apparatus, the step of applying or injecting the ultraviolet curing type anaerobic adhesive, the step of curing the adhesive, and the step of irradiating with ultraviolet rays are intermittently and automatically executed.

Embodiments

Examples for carrying out the invention are specifically described hereinafter.

EXAMPLE 1
(An Ultraviolet Curing Type Anaerobic Aadhesive Having a Tg of 140° C.)

An organic hydroperoxide, a photopolymerization initiator, a polymerization promoter and a stabilizer were further blended with a monomer composition containing a methacrylate diester (epoxydimethacrylate) at 85 mol %, hydroxyalkyl methacrylate at 10 mol %, and acrylic acid dimer at 5 mol %, thereby obtaining an adhesive composition for a polymer having a Tg (glass transition temperature) of 140° C. in an anaerobic environment.

(Applying the Adhesive to a Pivot Bearing Assembly and Primary Curing Step of the Adhesive)

Figure 1:
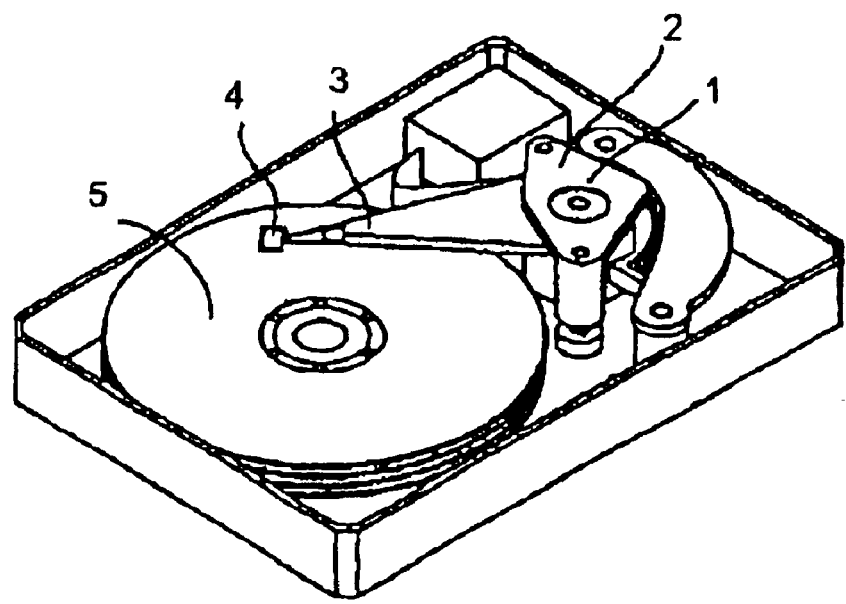
FIG. 1 is a perspective view of an example of a storage device.
Figure 2:
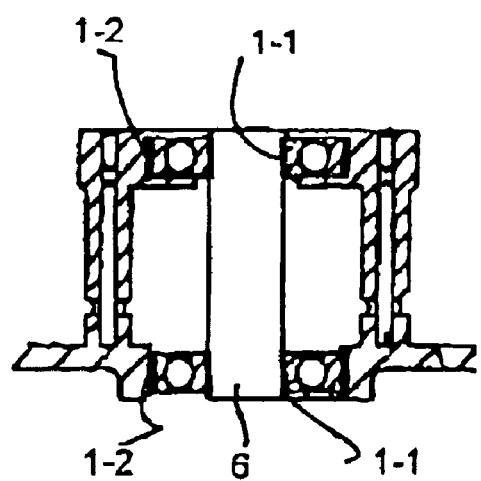
FIG. 2 is a cross sectional view of a pivot bearing assembly.

A plurality of pivot bearings and a shaft are prepared in an assembly apparatus, and after the assembly apparatus is placed under an extreme vacuum within an enclosed chamber, the adhesive was applied through nozzles to each of four application spots at 1-1 and 1-2 as shown in FIG. 2. The temperature inside the assembly apparatus was kept at 23° C., and after a minute of the adhesive application, the inside of the chamber was returned to an atmospheric pressure and the pivot assembly bearing taken out from the assembly apparatus. (A secondary curing step for overflowed portions of the adhesive)

The pivot bearing assembly was taken out from the assembly apparatus and loaded to a fixture to be irradiated at 6 mW/cm$^2$ per minute by an ultraviolet irradiator. Then the overflowed portions of adhesive 7, oozing out of a lower end of an inner ring of the pivot bearing, as shown in FIG. 3, were fully cured by the ultraviolet rays. The bonding strength of a shaft at 25° C. reached 880 N/cm$^2$ and the bonding strength of a sleeve at 25° C. reached 1600 N/cm$^2$. The results of a further measurement of bonding strength at 120° C. showed that the bonding strength of the shaft was 627 N/cm$^2$ and the bonding strength of the sleeve was 1510 N/cm$^2$.

EXAMPLE 2
(An Ultraviolet Curing type Anaerobic Adhesive Having a Tg of 180° C.)

An organic hydroperoxide, a photopolymerization initiator, a polymerization promoter and a stabilizer were further blended with a monomer composition containing a methacrylate diester (epoxydimethacrylate) at 96 mol %, hydroxyalkyl methacrylate at 3 mol %, and acrylic acid dimer at 1 mol %, thereby obtaining an adhesive composition for a polymer having a Tg (glass transition temperature) of 180° C. in an anaerobic environment.

(Applying the Adhesive to a Pivot Bearing Assembly and Primary Curing Step of the Adhesive)

A plurality of pivot bearings and a shaft are prepared in an assembly apparatus, and after the assembly apparatus is placed under an extreme vacuum within an enclosed chamber, the adhesive was applied through nozzles to each of four application spots at 1-1 and 1-2 as shown in FIG. 2. The temperature inside the assembly apparatus was kept at 23° C., and after 1.5 minutes of the adhesive application, the inside of the chamber was returned to an atmosphic pressure and the pivot assembly bearing taken out from the assembly apparatus.

(A Secondary Curing Step for Overflowed Portions of the Adhesive)

The pivot bearing assembly was taken out from the assembly apparatus and loaded to a fixture to be irradiated at 6 mW/cm$^2$ per minute by an ultraviolet irradiator. Then the overflowed portions of adhesive 7, oozing out of a lower end of an inner ring of the pivot bearing, as shown in FIG. 3, were fully cured by the ultraviolet rays. The bonding strength of a shaft at 25° C. reached 910 N/cm$^2$ and the bonding strength of a sleeve at 25° C. reached 1660 N/cm$^2$. The results of a further measurement of bonding strength at 120° C. showed that the bonding strength of the shaft was 640 N/cm$^2$ and the bonding strength of the sleeve was 1500 N/cm$^2$.

EXAMPLE 3
(An Ultraviolet Curing Type Anaerobic Adhesive Having a Tg of 120° C.)

An organic hydroperoxide, a photopolymerization initiator, a polymerization promoter and a stabilizer were further blended with a monomer composition containing a methacrylate diester (epoxydimethacrylate) at 80 mol %, hydroxyalkyl methacrylate at 10 mol %, and acrylic acid dimer at 10 mol %, thereby obtaining an adhesive composition for a polymer having a Tg (glass transition temperature) of 120° C. in an anaerobic environment.

(Applying the Adhesive to a Pivot Bearing Assembly and Primary Curing Step of the Adhesive)

A plurality of pivot bearings and a shaft are prepared in an assembly apparatus, and after the assembly apparatus is placed under an extreme vacuum within an enclosed chamber, the adhesive was applied through nozzles to each of four application spots at 1-1 and 1-2 as shown in FIG. 2. The temperature inside the assembly apparatus was kept at 23° C., and after 2 minutes of the adhesive application, the inside of the chamber was returned to an atmosphic pressure and the pivot assembly bearing taken out from the assembly apparatus.

(A Secondary Curing Step for Overflowed Portions of the Adhesive)

The pivot bearing assembly was taken out from the assembly apparatus and loaded to a fixture to be irradiated at 6 mW/cm$^2$ per minute by an ultraviolet irradiator. Then the overflowed portions of adhesive 7, oozing out of a lower end of an inner ring of the pivot bearing, as shown in FIG. 3, were fully cured by the ultraviolet rays. The bonding strength of a shaft at 25° C. reached 850 N/cm$^2$ and the bonding strength of a sleeve at 25° C. reached 1580 N/cm$^2$. The results of further measurement of bonding strength at 120° C. showed that the bonding strength of the shaft was 670 N/cm$^2$ and the bonding strength of the sleeve was 1390 N/cm$^2$.

COMPARATIVE EXAMPLE 1

(An Ultraviolet Curing Type Anaerobic Adhesive Having a Tg of 90° C.)

An organic hydroperoxide, a photopolymerization initiator, a polymerization promoter and a stabilizer were further blended with a monomer composition containing a methacrylate diester (epoxydimethacrylate) at 70 mol %, hydroxyalkyl methacrylate at 20 mol %, and acrylic acid dimmer at 10 mol %, thereby obtaining an adhesive composition for a polymer having a Tg (glass transition temperature) of 90° C. in an anaerobic environment.

(Applying the Adhesive to a Pivot Bearing Assembly and Primary Curing Step of the Adhesive)

A plurality of pivot bearings and a shaft are prepared in an assembly apparatus and after the assembly apparatus is placed under an extreme vacuum within an enclosed chamber, the adhesive was applied through nozzles to each of four application spots at 1-1 and 1-2 as shown in FIG. 2. The temperature inside the assembly apparatus was kept at 23° C., and after 1.5 minutes of the adhesive application, the inside of the chamber was returned to an atmosphric pressure and the pivot assembly bearing taken out from the assembly apparatus.

(A Secondary Curing Step for Overflowed Portions of the Adhesive)

The pivot bearing assembly was taken out from the assembly apparatus and loaded to a fixture to be irradiated at 6 mW cm$^2$ per minute by an ultraviolet irradiator. Then the overflowed portions of adhesive 7, oozing out of a lower end of an inner ring of the pivot bearing, as shown in FIG. 3, were fully cured by the ultraviolet rays. The bonding strength of a shaft at 25° C. was 730 N/cm$^2$ and the bonding strength of a sleeve at 25° C. was 1570 N/cm$^2$. The results of further measurement of the bonding strength at 120° C. showed that the bonding strength of the shaft was 300 N/cm$^2$ and the bonding strength of the sleeve was 490 N/cm$^2$.

COMPARATIVE EXAMPLE 2

(An Ultraviolet Curing Type Anaerobic Adhesive Having Tg 100° C.)

An organic hydroperoxide, a photopolymerization initiator, a polymerization promoter and a stabilizer were further blended with a monomer composition containing a methacrylate diester (epoxydimethacrylate) at 70 mol %, hydroxyalkyl methacrylate at 25 mol %, and acrylic acid dimer at 5 mol %, thereby obtaining an adhesive composition for a polymer having a Tg (glass transition temperature) of 100° C. in an anaerobic environment.

(Applying the Adhesive to a Pivot Bearing Assembly and Primary Curing Step of the Adhesive)

A plurality of pivot bearings and a shaft are prepared in an assembly apparatus, and after the assembly apparatus is placed under an extreme vacuum within an enclosed chamber, the adhesive was applied through nozzles to each of four application spots at 1-1 and 1-2 as shown in FIG. 2. The temperature inside the assembly apparatus was kept at 23° C., and after 1.5 minutes of the adhesive application, the inside of the chamber was returned to an atmospheric pressure and the pivot assembly bearing taken out from the assembly apparatus.

(A Secondary Curing Step for Overflowed Portions of the Adhesive)

The pivot bearing assembly was taken out from the assembly apparatus and loaded to a fixture to be irradiated at 6 mW/cm$^2$ per minute by an ultraviolet irradiator. Then the overflowed portions of adhesive 7, oozing out of a lower end of an inner ring of the pivot bearing, as shown in FIG. 3, were fully cured by the ultraviolet rays. The bonding strength of a shaft at 25° C. was 760 N/cm$^2$ and the bonding strength of a sleeve at 25° C. was 1900 N/cm$^2$. The results of further measurement of the bonding strength at 120° C. showed that the bonding strength of the shaft was 240 N/cm$^2$ and the bonding strength of the sleeve was 590 N/cm$^2$.

Tests for the amount of outgas characteristics and thermal compensation of bonding strength were conducted on the pivot bearing assembly obtained according to Examples 1, 2, 3, Comparative Examples 1 and 2, respectively.

Test Items

Amount of outgas characteristics:

An adhesive composition used for the tests was sufficiently cured and, subsequently, placed in a vessel. Purge and trap tests were conducted on the adhesive composition at 85° C. for 3 hours, measuring an amount of outgas generated per 1 (One) mg of each specimen.

Thermal Compensation of Bonding Strength:

A load is applied to the inner ring of the pivot bearing, measuring the thermal compensation of the bonding strength at a temperature in the range of 25 to 120° C. Based on the assumption that the bonding strength at 25° C. is 100 and detecting when the inner ring loosened from the shaft, each of the bonding strengths at 120° C. were determined.

Test results are shown in Table 1.

TABLE 1

|  | Example 1 | Example 2 | Example 3 | Comp. Exam. 1 | Comp. Exam. 2 |
|---|---|---|---|---|---|
| adhesive Tg (° C.) | 140 | 180 | 120 | 90 | 100 |
| outgas charac. | ◉ | ◉ | ○ | Δ | Δ |
| Bond strength charac. | ◉ | ◉ | ○ | Δ | Δ |

Remarks:
"charac." stands for characteristics.
outgas characteristics
◉ an amount of outgas generated = less than 10 μg
○ an amount of outgas generated = 10 to 30 μg
Δ an amount of outgas generated = in excess of 30 μg
Thermal compensation of bonding strength at 120° C.
◉ over 70
○ 40 to 70
Δ less than 40

With the embodiments of the invention, assembling was easily implemented, and in addition to, from the test results shown in Table 1, it was possible to manufacture a pivot assembly bearing with a low amount of outgas and improved thermal compensation of bonding strength.

What is claimed is:

1. A pivot bearing assembly comprising:
a bearing inner ring, a shaft, a bearing outer ring, and a housing, wherein the bearing inner ring and the shaft and the bearing outer ring and the housing are bonded and secured to each other with an ultraviolet curing anaerobic adhesive respectively.

2. A pivot assembly according to claim 1, wherein the ultraviolet curing anaerobic adhesive has a vitrification temperature not lower than 120° C. and lower than or equal to 200° C. and an overflowed portion of the adhesive is further cured by ultraviolet irradiation.

3. A pivot assembly according to claim 1, wherein the ultraviolet curing anaerobic adhesive comprises a composition containing a methacrylate diester as a main constituent, hydroxyalkyl methacrylate, an acrylic acid dimer, an organic hydroperoxide and a photopolymerization initiator.

* * * * *